(12) United States Patent
Iharada

(10) Patent No.: US 11,703,488 B2
(45) Date of Patent: Jul. 18, 2023

(54) COMBUSTION ANALYZING APPARATUS USING CARRIER GAS FLOW ADJUSTER TO INCREASE A CARRIER GAS FLOW RATE DURING MEASUREMENT

(71) Applicant: SHIMADZU CORPORATION, Kyoto (JP)

(72) Inventor: Takeshi Iharada, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 390 days.

(21) Appl. No.: 17/259,230

(22) PCT Filed: Jul. 27, 2018

(86) PCT No.: PCT/JP2018/028288
§ 371 (c)(1),
(2) Date: Jan. 11, 2021

(87) PCT Pub. No.: WO2020/021712
PCT Pub. Date: Jan. 30, 2020

(65) Prior Publication Data
US 2021/0270788 A1 Sep. 2, 2021

(51) Int. Cl.
*G01N 31/12* (2006.01)
(52) U.S. Cl.
CPC .................... *G01N 31/12* (2013.01)
(58) Field of Classification Search
CPC ..................................................... G01N 31/12
(Continued)

(56) References Cited

U.S. PATENT DOCUMENTS 3,296,435 A * 1/1967 Teal ........................ G01N 31/12
436/160
3,547,587 A * 12/1970 Innes ...................... G01N 25/48
436/139
(Continued)

FOREIGN PATENT DOCUMENTS

JP  2001-28251 A    1/2001
JP  2011220734 A  * 11/2011
(Continued)

OTHER PUBLICATIONS

Qian, J. et al, Analytical Chemistry 1996, 68, 3090-3097. (Year: 1996).*

(Continued)

*Primary Examiner* — Arlen Soderquist
(74) *Attorney, Agent, or Firm* — Sughrue Mion, PLLC

(57) ABSTRACT

The analyzing apparatus includes a reactor, a detector, a carrier gas supplier, a carrier gas flow rate adjustor, a flow control program memory, and a flow rate controller. The detector communicates with an internal space of the reactor, and detects a target substance generated by reaction of a specific component in the internal space. The carrier gas supplier supplies, to the internal space, carrier gas for transporting the target substance generated in the internal space. The carrier gas flow rate adjustor adjusts a carrier gas flow rate supplied from the carrier gas supplier to the internal space. The flow control program memory stores a flow control program set to increase the carrier gas flow rate during measurement from the process of introduction of a sample into the internal space to the process of detection of the target substance by the detector.

5 Claims, 4 Drawing Sheets

(58) Field of Classification Search
USPC .............................................. 422/79–80, 94
See application file for complete search history.

(56) References Cited

U.S. PATENT DOCUMENTS

| | | | | |
|---|---|---|---|---|
| 4,290,296 | A * | 9/1981 | Bredeweg | G01N 21/3504 250/252.1 |
| 4,525,328 | A * | 6/1985 | Bredeweg | G01N 31/12 436/115 |
| 4,582,686 | A | 4/1986 | Tsuji | |
| 6,653,143 | B2 * | 11/2003 | Ragaglia | G01N 31/12 436/160 |
| 2004/0171165 | A1 * | 9/2004 | Mitchell | G01N 31/12 422/78 |
| 2007/0254374 | A1 * | 11/2007 | Iharada | G01N 33/1846 436/146 |
| 2010/0159602 | A1 * | 6/2010 | Conway | G01N 33/1846 436/119 |
| 2014/0004003 | A1 * | 1/2014 | Inoue | G01N 31/12 422/83 |

FOREIGN PATENT DOCUMENTS

| | | |
|---|---|---|
| JP | 2012-202887 A | 10/2012 |
| JP | 2015-59777 A | 3/2015 |

OTHER PUBLICATIONS

Peterson, M. L. et al, Marine Chemistry 2003, 81, 89-104. (Year: 2003).*
Office Action dated Jan. 11, 2022 in Japanese Application No. 2020-532117.
International search report for PCT/JP 2018/028288 dated Oct. 30, 2018.
Written opinion for PCT/JP 2018/028288 dated Oct. 30, 2018.
Communication dated May 13, 2022 from the German Patent Office in Application No. 11 2018 007 859.0.
Office Action dated Feb. 22, 2022 by the Chinese Patent Office in Chinese Application No. 201880095700.X.

* cited by examiner

COMBUSTION ANALYZING APPARATUS USING CARRIER GAS FLOW ADJUSTER TO INCREASE A CARRIER GAS FLOW RATE DURING MEASUREMENT

CROSS-REFERENCE TO RELATED APPLICATIONS

This application is a National Stage of International Application No. PCT/JP2018/028288 filed Jul. 27, 2018.

TECHNICAL FIELD

The present invention relates to an analyzing apparatus that has a reactor for causing a reaction such as an oxidation reaction to occur in a specific component in a sample, and is configured to supply carrier gas to the reactor and transport a reaction product to a detector.

BACKGROUND ART

As one of analyzing apparatus having a reactor for causing a reaction to occur in a specific component in a sample, there is a combustion oxidation type carbon measuring device (hereinafter, TOC meter) (see Patent Document 1).

Generally, a TOC meter includes an oxidation reactor for converting a carbon component in a sample into carbon dioxide, a detector for detecting carbon dioxide generated in the oxidation reactor, and a carrier gas supplier that supplies carrier gas for transporting carbon dioxide generated in the oxidation reactor to the oxidation reactor. The oxidation reactor includes a combustion tube made from quartz glass containing an oxidation catalyst, and the combustion tube is heated to a high temperature (for example, about 680° C.). High-purity air is supplied to the combustion tube from the carrier gas supplier as carrier gas and combustion supporting gas. When a sample is injected into the combustion tube by a sample injector, a carbon component in the sample is converted to carbon dioxide by the action of the oxidation catalyst, and the carbon dioxide is guided by the carrier gas to a detector, such as a non-dispersive infrared absorbance detector (NDIR), and detected.

PRIOR ART DOCUMENTS

Patent Documents

Patent Document 1: Japanese Patent Laid-open Publication No. 2012-202887

SUMMARY OF THE INVENTION

Problems to be Solved by the Invention

A detector such as an NDIR measures the carbon dioxide concentration in the carrier gas flowing in a flow cell, and obtains a peak-shaped detection signal having time on the horizontal axis and signal strength on the vertical axis. In a peak waveform of the detection signal, a rising portion of the peak is steep, while a falling shape in the latter half of the peak is a gentle curved shape. The reason why the falling shape in the latter half of the peak becomes gentle is that carbon dioxide diffuses in the carrier gas, and the carbon dioxide concentration in the carrier gas decreases toward the latter half of the peak.

If the shape of the falling portion of the detection signal peak becomes gentle, not only the measurement time becomes long, but also the reproducibility of the peak shape deteriorates, which leads to a decrease in measurement accuracy. It is conceivable to increase a carrier gas flow rate in order to shorten the measurement time. However, if the carrier gas flow rate is increased, the time for the sample to stay in the oxidation reactor is shortened, and the oxidation reaction of the carbon component may become insufficient.

In view of the above, an object of the present invention is to shorten the measurement time while preventing the reaction in the reactor of a specific component in the sample from becoming insufficient.

Solutions to the Problems

The analyzing apparatus according to the present invention includes a reactor, a detector, a carrier gas supplier, a carrier gas flow rate adjustor, a flow control program memory, and a flow rate controller. The reactor has internal space into which a sample is introduced, and is for causing a reaction to occur in a specific component included in the sample introduced into the internal space. The detector communicates with the internal space of the reactor, and detects a target substance generated by reaction of the specific component in the internal space of the reactor. The carrier gas supplier supplies, to the internal space, carrier gas for transporting the target substance generated in the internal space of the reactor to the detector. The carrier gas flow rate adjustor adjusts a carrier gas flow rate supplied from the carrier gas supplier to the internal space of the reactor. The flow control program memory stores a flow control program set to increase the carrier gas flow rate during a measurement from the process of introduction of the sample into the internal space of the reactor to the process of detection of the target substance by the detector. The flow rate controller is configured to control the carrier gas flow rate during the measurement based on the flow control program.

That is, in the analyzing apparatus according to the present invention, at the beginning of the measurement of a sample, the carrier gas flow rate is suppressed so that a specific component in the sample reacts sufficiently in the reactor, and then the carrier gas flow rate is increased to prevent a falling portion of a detection signal peak of the detector from becoming gentle.

In the analyzing apparatus of the present invention, the flow control program may be set to gradually increase the carrier gas flow rate from start to end of the measurement.

Furthermore, the analyzing apparatus of the present invention may further include a program setting changer configured to change setting of the flow control program based on an input by user. In such a manner, a change pattern of the carrier gas flow rate during the measurement of a sample can be freely set according to the properties of the sample.

It should be noted that it is also conceivable to set the carrier gas flow rate to zero for a certain period of time after the measurement of a sample is started so that reaction of a specific component is sufficiently performed in the reactor. However, in a case where the reactor oxidizes a carbon component in a sample and converts the component into carbon dioxide, it is conceivable that combustion in the reactor becomes incomplete when a flow rate of the carrier gas supplied into the reactor becomes zero since the carrier gas supplied into the reactor also serves as combustion supporting gas. In view of the above, in the analyzing apparatus according to the present invention, the carrier gas is preferably continuously supplied from the carrier gas supplier to the internal space of the reactor during the measurement.

Effects of the Invention

In the analyzing apparatus according to the present invention, at the beginning of the measurement of a sample, the carrier gas flow rate is suppressed so that a specific component in the sample reacts sufficiently in the reactor, and then the carrier gas flow rate is increased to prevent a falling portion of a detection signal peak of the detector from becoming gentle. Accordingly, it is possible to shorten the measurement time while preventing the reaction in the reactor of a specific component in the sample from becoming insufficient.

EMBODIMENT OF THE INVENTION

Figure 1:
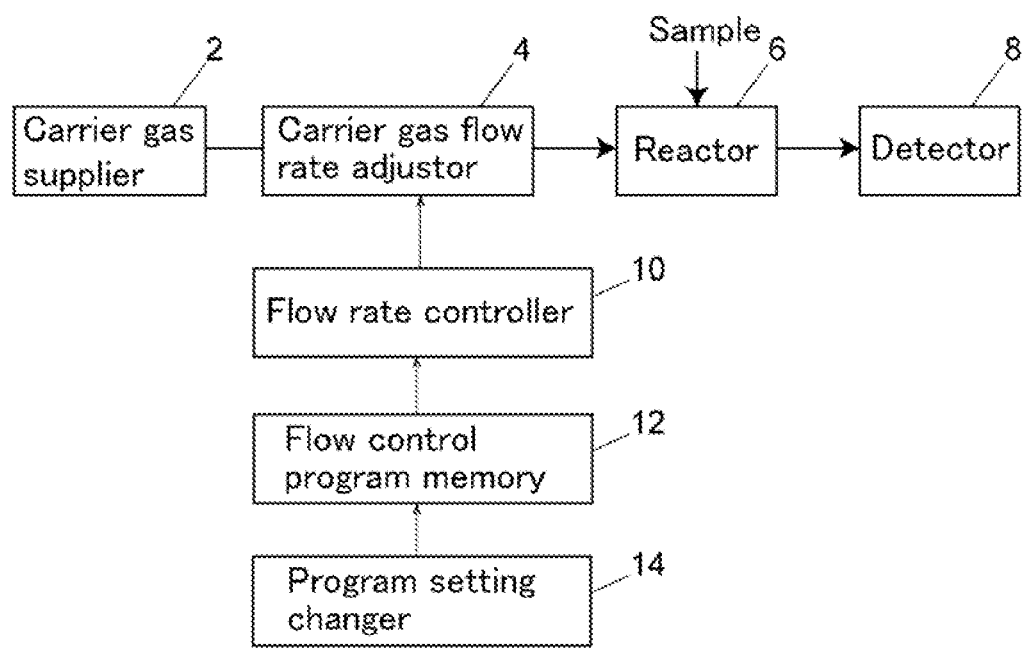
FIG. 1 is a block diagram schematically showing a configuration of an embodiment of an analyzing apparatus.

The configuration of an embodiment of the analyzing apparatus according to the present invention will be described with reference to FIG. 1.

The analyzing apparatus includes a carrier gas supplier 2, a carrier gas flow rate adjustor 4, a reactor 6, a detector 8, a flow rate controller 10, a flow control program memory 12, and a program setting changer 14.

The reactor 6 has internal space into which a sample is introduced, and is for causing a reaction such as oxidation to occur in a specific component in the sample introduced into the internal space. Carrier gas is supplied from the carrier gas supplier 2 to the internal space of the reactor 6. A flow rate of the carrier gas supplied from the carrier gas supplier 2 (hereinafter referred to as the carrier gas flow rate) is adjusted by the carrier gas flow rate adjustor 4.

The detector 8 is in fluid communication with the internal space of the reactor 6, and is for detecting a component to be detected generated by the reaction in the reactor 6. The component to be detected generated in the reactor 6 is transported to the detector 8 by the carrier gas from the carrier gas supplier 2.

The flow rate controller 10 is configured to control the carrier gas flow rate adjustor 4 to adjust the carrier gas flow rate according to a flow control program described later. The flow control program is set to increase the carrier gas flow rate during one time of measurement from the process of introduction of the sample into the reactor 6 to the process of detection of the component to be detected by the detector 8. The flow control program is held in the flow control program memory 12.

Figure 3:
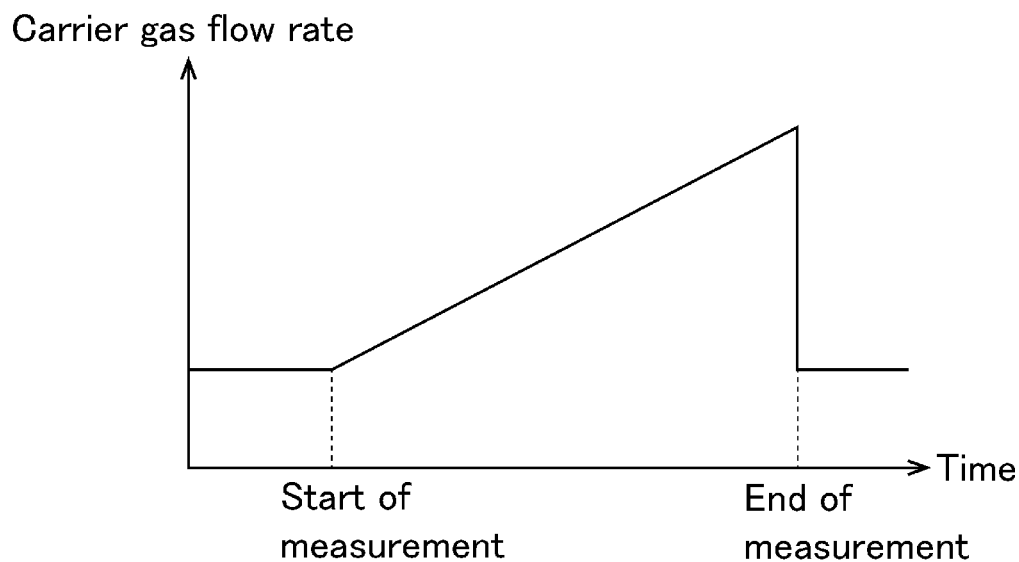
FIG. 3 is a graph for explaining an example of control of a carrier gas flow rate during the measurement of the embodiment.
Figure 4:
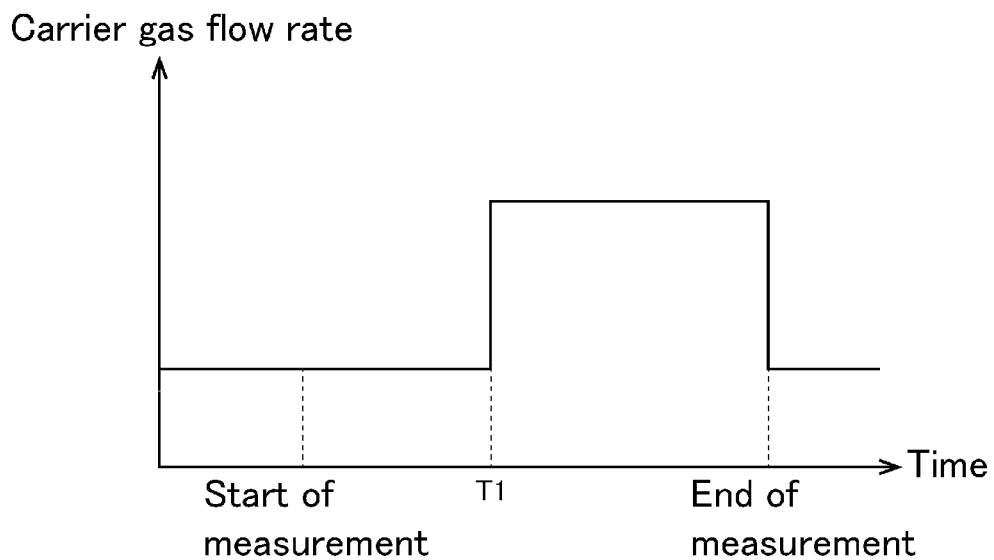
FIG. 4 is a graph for explaining another example of the control of a carrier gas flow rate during the measurement of the embodiment.
Figure 5:
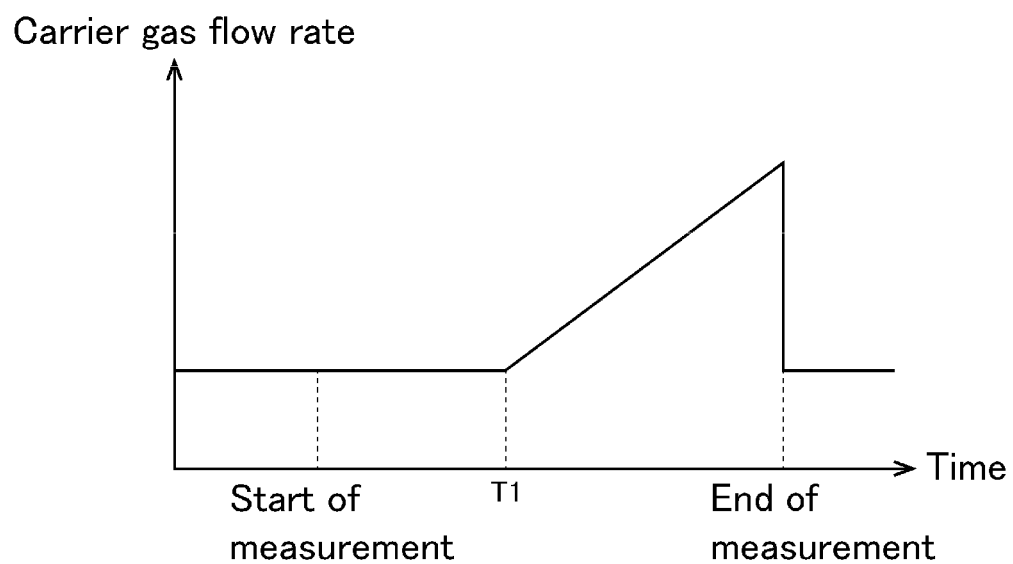
FIG. 5 is a graph for explaining still another example of the control of a carrier gas flow rate during the measurement of the embodiment.

The program setting changer 14 is configured to change the setting of the flow control program based on the user input. That is, the user can optionally set how to increase the carrier gas flow rate during one time of measurement. For example, as shown in FIG. 3, the carrier gas flow rate can be set to gradually increase (for example, at 1-minute intervals) from the start of measurement to the end of measurement. Further, as shown in FIG. 4, the setting can be made to maintain a relatively low carrier gas flow rate from the start of measurement to time T1 and to maintain a higher carrier gas flow rate from time T1 to the end of measurement. Furthermore, as shown in FIG. 5, the setting can also be made to maintain a relatively low carrier gas flow rate from the start of measurement to time T1 and to gradually inform the carrier gas flow rate from time T1 to the end of measurement.

Figure 2:
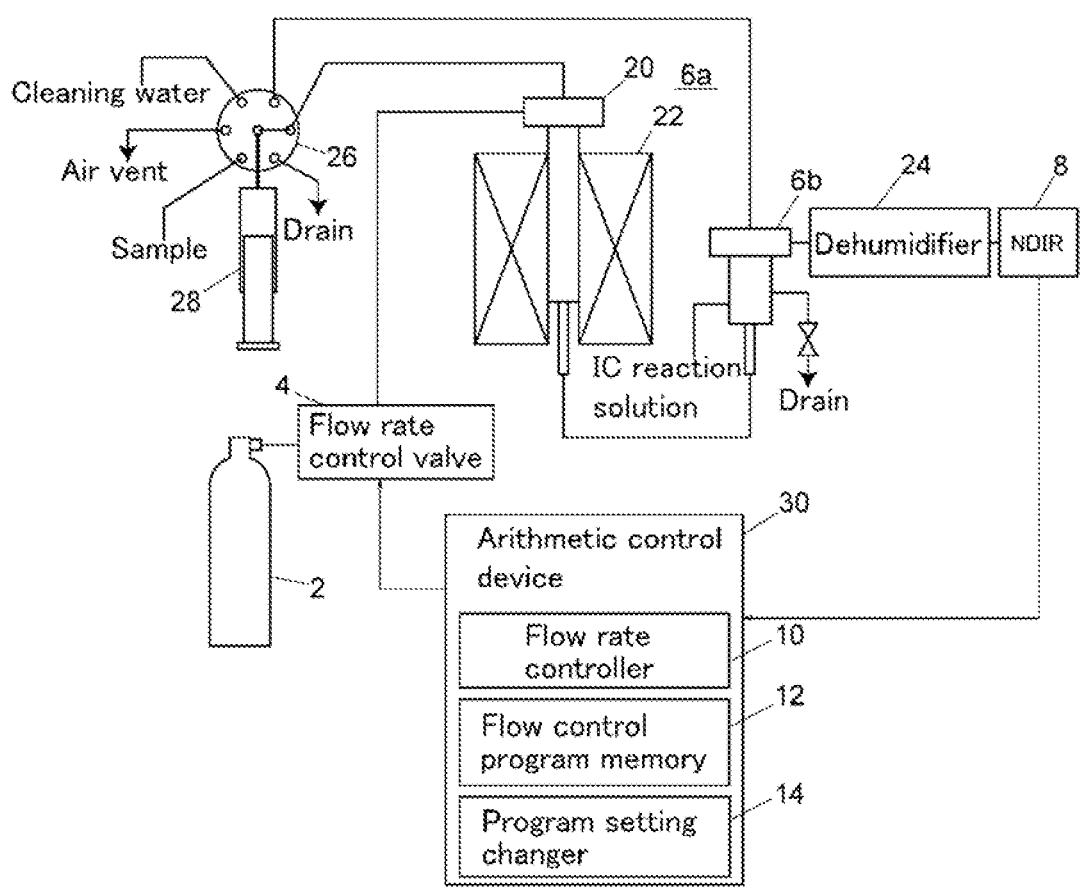
FIG. 2 is a schematic configuration diagram showing an example of a more specific configuration of the embodiment.

The analyzing apparatus can be realized by the TOC meter shown in FIG. 2. The TOC meter shown in FIG. 2 will be described below.

The TOC meter includes a high-purity air cylinder 2 as a carrier gas supplier, a flow rate control valve 4 as a carrier gas flow rate adjustor, a TC oxidation unit 6a and an IC reactor 6b as a reactor, and an NDIR 8 as a detector. The flow rate controller 10, the flow control program memory 12, and the program setting changer 14 are realized as functions of an arithmetic control device 30 for controlling the overall operation of the TOC meter. The arithmetic control device 30 is realized by a dedicated computer or a general-purpose personal computer. The flow rate controller 10 and the program setting changer 14 are functions obtained by an arithmetic element in the arithmetic control device 30 executing a predetermined program, and the flow control program memory 12 is a function realized by part of a storage area of a storage device in the arithmetic control device 30.

Furthermore, the TOC meter includes a multi-port valve 26 and a syringe pump 28. The syringe pump 28 is for introducing a sample into the TC oxidation unit 6a and the IC reactor 6b, and is connected to a common port at the center of the multi-port valve 26. To each of six selection ports of the multi-port valve 26, a pipe leading to a sample injection port of a combustion tube 20 of the TC oxidation unit 6a, a pipe leading to a sample injection port of the IC reactor 6b, a container for storing cleaning water, a pipe for air vent, a container for storing a sample, and a drain pipe are connected. By the operation of the multi-port valve 26 and the syringe pump 28, a sample can be introduced into either one of the combustion tube 20 of the TC oxidation unit 6a or the IC reactor 6b.

The combustion tube 20 of the TC oxidation unit 6a is made from quartz glass or the like, and has the inside filled with an oxidation catalyst. The combustion tube 20 is heated by a heating furnace 22 to, for example, about 680° C. The IC reactor 6b contains an IC reaction solution (for example, a 25% phosphoric acid aqueous solution) for converting inorganic carbon (IC) into carbon dioxide. The IC reactor 6b is connected in series to a latter stage of the combustion tube 20 of the TC oxidation unit 6a. An outlet of the IC reactor 6b communicates fluidly with the NDIR 8 via a dehumidifier 24.

The high-purity air cylinder 2 is connected to a carrier gas inlet of the combustion tube 20 via the flow rate control valve 4, and high-purity air from the high-purity air cylinder 2 is supplied to the combustion tube 20 as carrier gas and combustion supporting gas while having a flow rate controlled by the flow rate control valve 4.

In total carbon (TC) measurement, the syringe pump 28 that has sucked a sample is connected to the sample injection port of the combustion tube 20, and the sample is injected into the combustion tube 20. A carbon component in the sample injected into the combustion tube 20 is converted into carbon dioxide (component to be detected) by the action of the oxidation catalyst in the combustion tube 20. The carbon dioxide generated in the combustion tube 20 is transported to the NDIR 8 via the IC reactor 6b and the dehumidifier 24 by the carrier gas supplied from the high-purity air cylinder 2 and detected.

During the above TC measurement, the flow rate controller 10 of the arithmetic control device 30 controls operation of the flow control valve 4 so that a flow rate of the carrier gas supplied to the combustion tube 20 is increased gradually or stepwise according to the flow control program held in the flow control program memory 12. In this manner, in the early stage of the TC measurement, the carrier gas flow rate is suppressed to a relatively low flow rate, and the oxidation reaction of the carbon component in the sample introduced into the combustion tube 20 is sufficiently performed. After that, as the carrier gas flow rate rises, a falling portion of a detection signal peak of the NDIR 8 is prevented from becoming gentle, and the TC measurement time can be shortened.

In IC measurement, the syringe pump 28 that has sucked the sample is connected to the sample injection port of the IC reactor 6b, and the sample is injected into the IC reactor 6b. In the IC reactor 6b, IC in the acidified sample is converted into carbon dioxide. The carbon dioxide generated in the IC reactor 6b is introduced into the NDIR 8 via the dehumidifier 24 by the carrier gas supplied from the high-purity air cylinder 2 via the combustion tube 20 and detected.

During the above IC measurement as well, the flow rate controller 10 of the arithmetic control device 30 controls operation of the flow control valve 4 so that a flow rate of the carrier gas supplied to the IC reactor 6b via the combustion tube 20 is increased gradually or stepwise according to the flow control program held in the flow control program memory 12. In this manner, in the early stage of the IC measurement, the carrier gas flow rate is suppressed to a relatively low flow rate, and the reaction of the IC component in the sample introduced into the IC reactor 6b is sufficiently performed. After that, as the carrier gas flow rate rises, a falling portion of a detection signal peak of the NDIR 8 is prevented from becoming gentle, and the IC measurement time can be shortened.

The TC in the sample can be quantified from an area value of the detection signal peak obtained by the above TC measurement, and the IC in the sample can be quantified from an area value of the detection signal peak obtained by the IC measurement. Then, the TOC value in the sample can be obtained by subtracting the IC value from the obtained TC value.

It should be noted that, in the above embodiment, the flow rate control valve 4 is controlled so that the carrier gas flow rate increases gradually or stepwise during both the TC measurement and the IC measurement. However, the present invention is limited to this, and the configuration may be such that such control is performed during only either one of the TC measurement and the IC measurement.

In the above, the TOC meter is described as an example of the analyzing apparatus according to the present invention. However, the present invention is not limited to this, and can be similarly applied to a carbon analyzing apparatus as disclosed in, for example, Japanese Patent Laid-Open Publication No. 2013-250171.

DESCRIPTION OF REFERENCE SIGNS

2: Carrier gas supplier (high-purity air cylinder)
4: Carrier gas flow adjustor (flow control valve)
6: Reactor
6a: TC oxidation unit
6b: IC reactor
8: Detector (NDIR)
10: Flow rate controller
12: Flow control program memory
14: Program setting changer
20: Combustion tube
22: Heating furnace
24: Dehumidifier
26: Multi-port valve
28: Syringe pump
30: Arithmetic control device

The invention claimed is:

1. An analyzing apparatus comprising:
a reactor that has internal space into which a sample is to be introduced, the reactor configured to cause a reaction of a specific component included in the sample introduced into the internal space;
a detector that communicates with the internal space of the reactor, the detector configured to detect a target substance generated by reaction of the specific component in the internal space of the reactor;
a carrier gas supplier for supplying, to the internal space, carrier gas for transporting the target substance generated in the internal space of the reactor to the detector;
a carrier gas flow rate adjustor for adjusting a carrier gas flow rate supplied from the carrier gas supplier to the internal space of the reactor;
a flow control program memory for storing a flow control program set to increase the carrier gas flow rate during a measurement from the process of introduction of the sample into the internal space of the reactor to the process of detection of the target substance by the detector; and
a flow rate controller configured to control the carrier gas flow rate during the measurement based on the flow control program.

2. The analyzing apparatus according to claim 1, wherein the flow control program is set to gradually increase the carrier gas flow rate from start to end of the measurement.

3. The analyzing apparatus according to claim 2, further comprising a program setting changer configured to change setting of the flow control program based on an input by user.

4. The analyzing apparatus according to claim 1, further comprising a program setting changer configured to change setting of the flow control program based on an input by user.

5. The analyzing apparatus according to claim 1, wherein the flow control program is set to keep supplying carrier gas from the carrier gas supplier to the internal space of the reactor during the measurement.

* * * * *